(12) United States Patent
Veneruso et al.

(10) Patent No.: US 7,154,413 B2
(45) Date of Patent: Dec. 26, 2006

(54) FUSED AND SEALED CONNECTOR SYSTEM FOR PERMANENT RESERVOIR MONITORING AND PRODUCTION CONTROL

(75) Inventors: Anthony F. Veneruso, Missouri City, TX (US); Alan Baker, Telford (GB); Harjit Kohli, Dunecht (GB); Richard E. Mixon, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 427 days.

(21) Appl. No.: 10/733,586

(22) Filed: Dec. 11, 2003

(65) Prior Publication Data

US 2005/0128101 A1 Jun. 16, 2005

(51) Int. Cl.
*G01V 3/00* (2006.01)
(52) U.S. Cl. .............. 340/854.9; 340/854.7; 340/854.8; 439/281; 439/606; 439/736
(58) Field of Classification Search ............ 340/854.7, 340/854.8, 854.9, 855.1; 439/281, 736, 606
See application file for complete search history.

(56) References Cited

U.S. PATENT DOCUMENTS

| | | | |
|---|---|---|---|
| 6,252,518 B1 | 6/2001 | Laborde | |
| 6,374,913 B1 | 4/2002 | Robbins et al. | |
| 6,506,083 B1 | 1/2003 | Bickford et al. | |
| 6,821,162 B1* | 11/2004 | Mott et al. | 439/722 |
| 2001/0027864 A1 | 10/2001 | Vaynshteyn | |
| 2002/0066568 A1 | 6/2002 | Buchanan et al. | |
| 2003/0111796 A1 | 6/2003 | Kohli et al. | |

FOREIGN PATENT DOCUMENTS

| | | | | |
|---|---|---|---|---|
| GB | 272477 | | | 9/1927 |
| GB | 358992 | | | 10/1931 |
| GB | 1042000 | | | 9/1966 |
| GB | 2320984 | A | * | 7/1998 |
| GB | 2395502 | | | 5/2004 |
| JP | 3024837 | A | | 2/1991 |
| JP | 6060928 | A | | 3/1994 |
| JP | 7254346 | A | | 10/1995 |
| JP | 07280621 | | * | 10/1995 |

* cited by examiner

*Primary Examiner*—Jeffery Hofsass
*Assistant Examiner*—Sisay Yacob
(74) *Attorney, Agent, or Firm*—Van Someren, PC; Kevin P. McEnaney; Jaime A. Castano (57) ABSTRACT

A connection system is provided for facilitating a downhole electrical reservoir monitoring and/or control system operated by a surface system. The connector system includes a set of fuses and a fuse blowing circuit for isolating a short circuit event and restoring functionality to the remaining components of the downhole system.

25 Claims, 7 Drawing Sheets

FUSED AND SEALED CONNECTOR SYSTEM FOR PERMANENT RESERVOIR MONITORING AND PRODUCTION CONTROL

TECHNICAL FIELD

The present invention relates to reservoir monitoring and control, and more particularly to a system for restoring functionality to a series of downhole electrical monitoring and control devices wherein one or more of the devices has failed due to a short circuit event and wherein functionality is restored by electrically isolating the short circuit event.

BACKGROUND

When multiple electrical devices are connected to a common cable for power supply and/or communication, the entire system will fail if there is a short circuit from the cable to ground anywhere along the cable, in any of the connections, or in any one of the devices. In downhole operations, such short circuit failures are oftentimes caused by wellbore fluid or seawater penetration into the cable or device.

Accordingly, a need exists for a system to restore operation to a maximum number of electrical devices connected to a power supply via a single downhole cable that has experienced a short circuit event. The present invention is directed at providing such a system.

SUMMARY

In general, according to one embodiment of the present invention, a system for use in restoring functionality to a set of downhole electrical devices connected via a common shared cable and disabled due to a short circuit event is provided.

In general, according to another embodiment of the present invention, a system for restoring downhole operations comprises a plurality of electrical fuses and diodes arranged to isolate a short circuited device from a set of interconnected downhole electrical devices and restore functionality to the remaining devices in the set.

In general, according to yet another embodiment of the present invention, a system for restoring downhole operations comprises a plurality of seals arranged to isolate a downhole device infiltrated with conductive fluid from a set of interconnected downhole electrical devices and prevent migration of the conductive fluid into the remaining devices of the set.

Other or alternative features will become apparent from the following description, from the drawings, and from the claims.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: (1) the terms "connect", "connection", "connected", "in connection with", and "connecting" are used to mean "in direct connection with" or "in connection with via another element"; (2) the term "set" is used to mean "one element" or "more than one element"; and (3) the term "switch" or "switching device" is used to mean "any conventional device for alternatively connecting and disconnecting elements to a circuit." As used herein, the terms "up" and "down", "upper" and "lower", "upwardly" and downwardly", "upstream" and "downstream"; "above" and "below"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Figure 1:
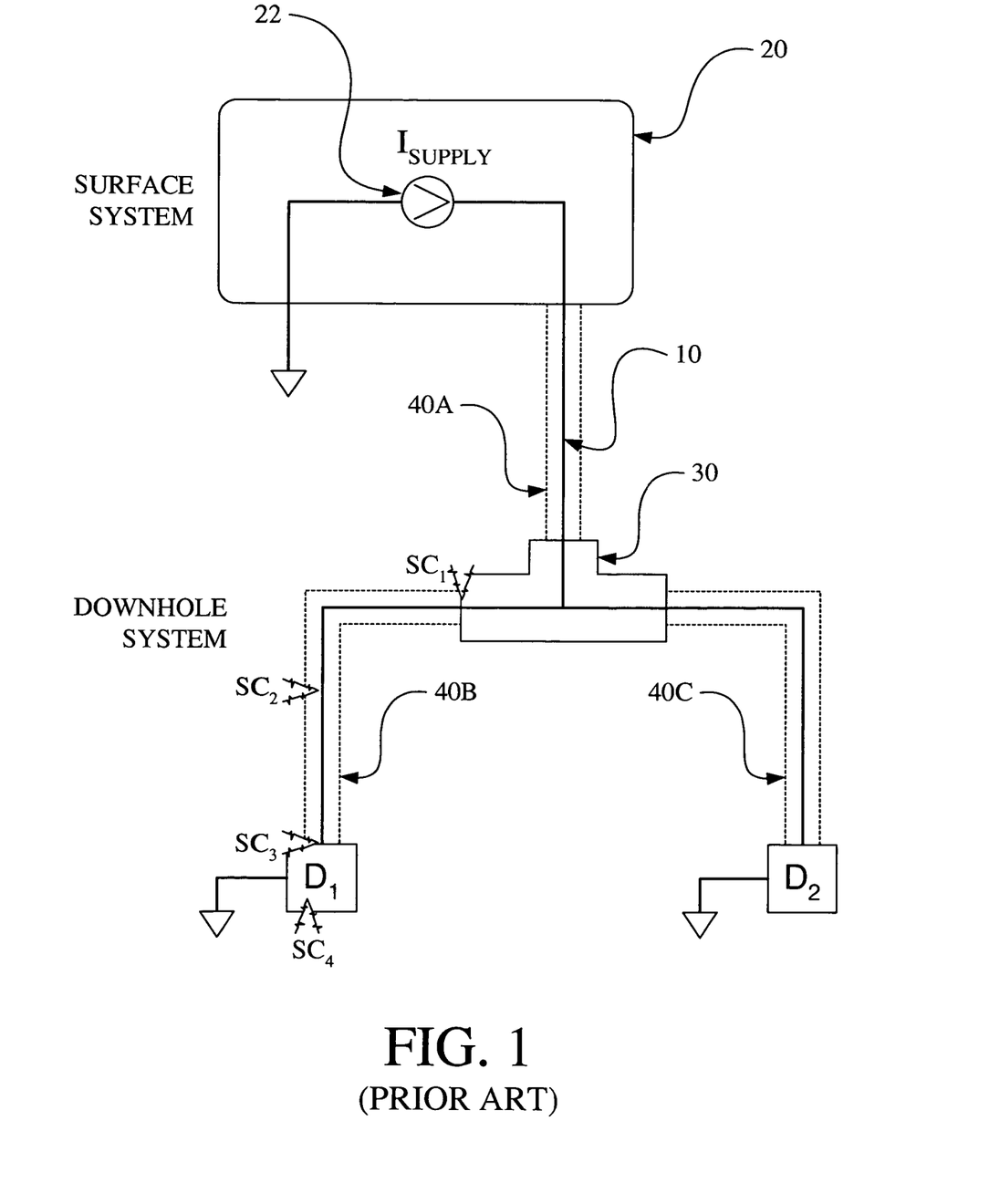
FIG. 1 is a schematic view of a typical prior art system for connecting downhole devices to a surface power source.

In some downhole applications where a plurality of electrical devices are connected to and receive power via a single supply line, it is desirable to restore functionality to one or more of these electrical devices when a short circuit condition has developed. As shown in FIG. 1, a typical prior art wellbore monitoring and control system includes a surface system and a downhole system. The surface system comprises a power source 22 for supplying sufficient current to operate the downhole system. The downhole system comprises a plurality of electrical devices D1, D2, connected to the current source 22 via a single supply line 10. The electrical devices D1, D2 may be any device used in wellbore reservoir monitoring and/or control including but not limited to, pressure gauges, temperature gauges, flow meters, fluid density meters, pH sensors, corrosion sensors, downhole instrumentation, electronic and/or electromechanical control valves, on-off valves, choke valves, and gas lift valves. One or more downhole connectors 30 are typically employed to connect multiple devices D1, D2 to the single supply line 10. Typically, the supply line is comprised of an electrically insulated copper wire. Moreover, the supply line 10 and auxiliary lines 11, 12 may be shielded from exposure to downhole fluids and conditions by enclosing or encasing them within sealed metal tubes 40A, 40B, and 40C. This type of supply line is known to those skilled in the art of downhole instrumentation and control as "tubing encased cable" or "permanent downhole cable".

The wellbore environment can be very challenging such that devices run downhole are generally subjected to high thermal, chemical and mechanical stresses. In the event that the protective shielding 40B of the downhole system is somehow damaged or weakened at any point, for example SC1, SC2, SC3, or SC4, the downhole device D1 may become exposed to infiltrating conductive fluids, such as wellbore fluid or saltwater. This exposure could result in short circuiting the device D1 to ground. Such a short circuit condition would electrically disable the entire downhole system, including downhole device D2, even though the shielding 40C remains undamaged and unpenetrated by conductive fluids. Moreover, if a fluid leak path or connection exists between devices D1, D2 via an internal path from tube 40B, to connector 30 and then to tube 40C, after prolonged exposure to the wellbore environment, the conductive fluid infiltrating downhole device D1 will eventually migrate and infiltrate downhole device D2 via the downhole connector 30.

This invention addresses the above problems in a straightforward way by electric and fluidic isolation of the failed section from the remaining operational parts of the system.

Figure 2:
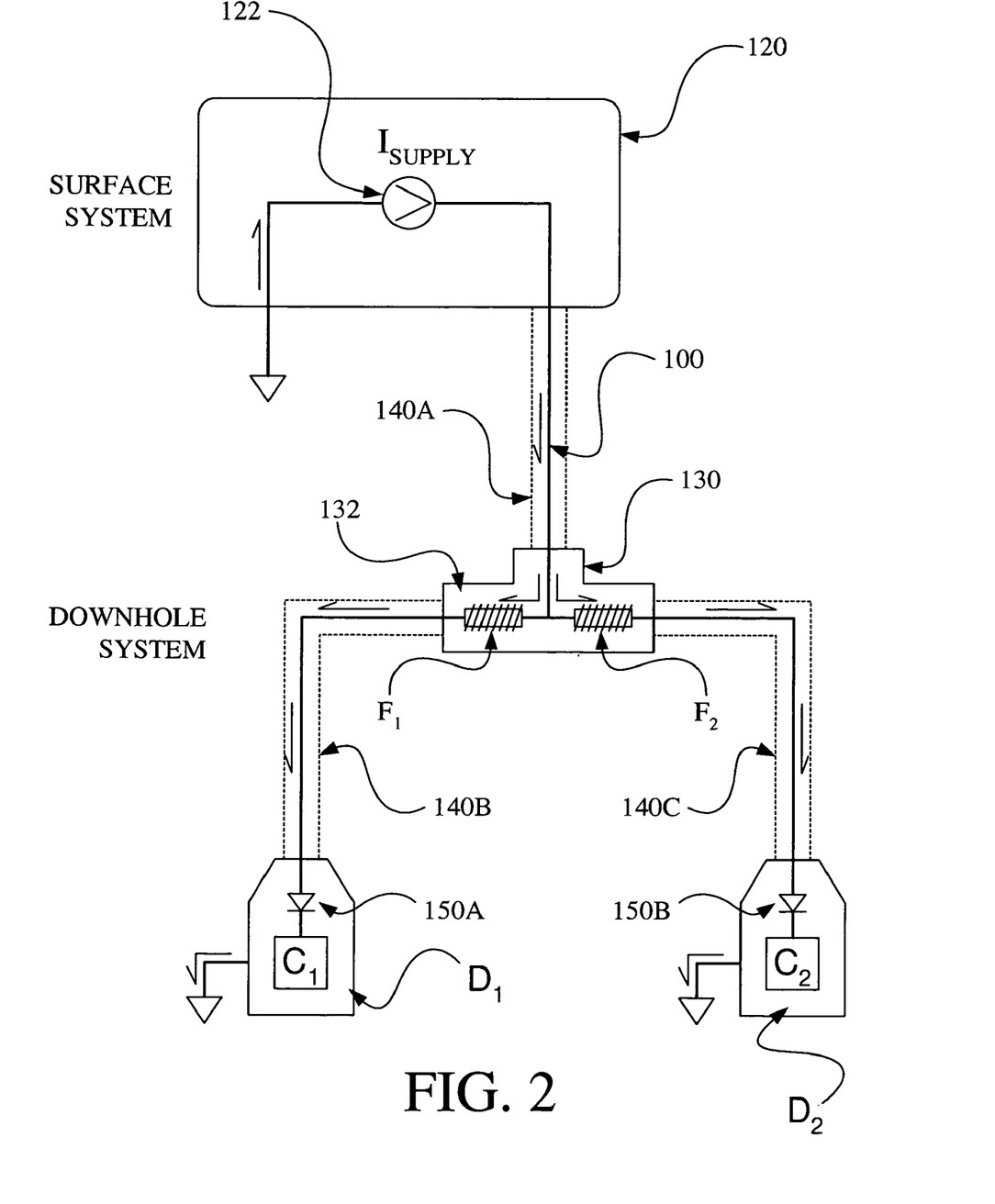
FIG. 2 is a schematic view of an embodiment of the connection system of the present invention illustrating a set of downhole devices connected to a surface power source wherein all of the devices are in operating condition.

With reference to FIG. 2, one embodiment of the present invention includes a downhole system and a surface system connected by a line 100 for supplying power and/or telemetry from the surface system to the downhole system. The surface system is located outside the wellbore and is accessible to an operator for controlling, monitoring, and/or otherwise operating the downhole system. The surface system includes a power circuit 120 having a current source 122 for supplying a first current to power the downhole system via the line 100. The downhole system includes a plurality of electrical devices D1, D2 that are installed, mounted, positioned, or otherwise arranged in the wellbore. Examples of a downhole system include, inter alia, a reservoir temperature and pressure monitoring system, a flow and fluid density measurement system, a corrosion detection system, a flow control system, and so forth. The line 100 connects the surface system to the downhole system. The line 100 may be a shared power supply cable, a power line, a tubing encased cable, a permanent downhole cable, or any medium for facilitating communication between the downhole system and the surface system. Furthermore, the line may include a conduit for enclosure. Moreover, both the current source 122 of the surface system and the electrical devices D1, D2 of the downhole system are typically connected to a common ground to close the circuit. For example, the common ground may be a casing or other tubular member or a separate return line or cable running from the downhole system to the surface system.

Figure 4:
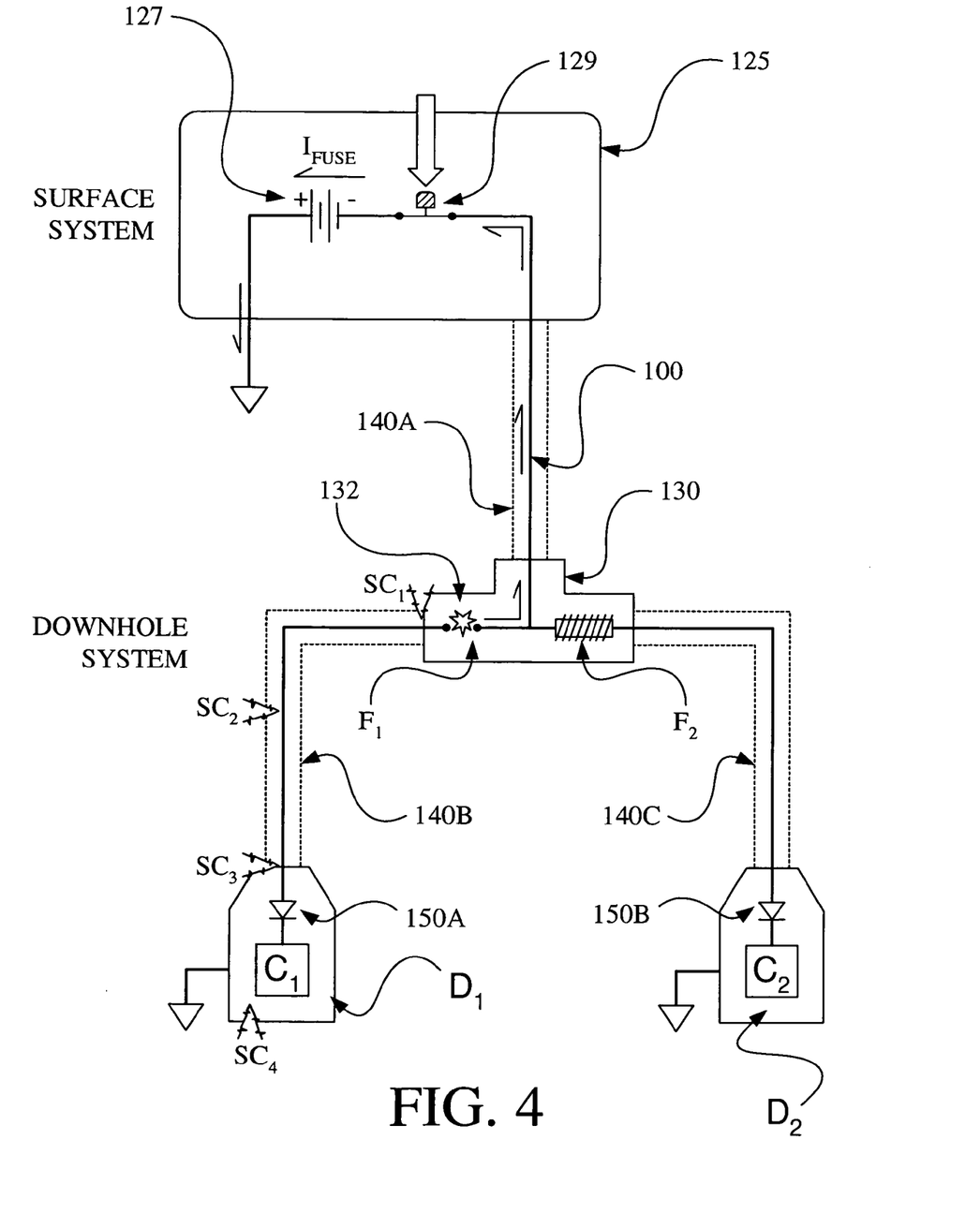
FIG. 4 is a schematic view of an embodiment of the connection system of the present invention illustrating a set of downhole devices connected to a surface power source wherein the surface power source includes a fuse-opening circuit for opening the fuse of one of the downhole devices experiencing a short circuit condition.

Each electrical device D1, D2 includes an operating circuit C1, C2 for performing a dedicated function and a conventional reverse-polarity protection diode 150A, 150B for protecting each operating circuit C1, C2 from a current opposite that of the current source 122. The dedicated function of the circuits C1, C2 is dictated by the type of downhole system employed. For example, the circuits C1, C2 may function to measure wellbore temperature and pressure, to measure fluid flow, to measure pH of the wellbore fluid, to open and close a set of valves, or to perform some other function. The reverse-polarity protection diodes 150A, 150B operate as a function of the polarity of the current being supplied thereto. For example, the diodes 150A, 150B are preset such that when they receive a current ($I_{SUPPLY}$) from the current source 122, each diode permits the current to flow therethrough. Accordingly, when the diodes 150A, 150B receive a current having a polarity opposite that of $I_{SUPPLY}$ (for example $I_{FUSE}$ as shown in FIG. 4), each diode prevents the flow of current therethrough.

The downhole system further includes a downhole connector 130 for connecting the electrical devices D1, D2 to the line 100. The downhole connector includes a housing 132 and a set of fuses F1, F2 arranged therein for connection to the set of electrical devices D1, D2 respectively. The fuses F1, F2 are selected to remain closed under an operating current and to open or "blow" under a fusing current or a pre-selected current of a higher magnitude than that of the operating current. For example, an operating current of 0.25 Amperes may be supplied to the downhole system to operate the electrical devices D1, D2 which are protected by fuses F1, F2 having a fusing current of 1.0 Amperes. Since the operating current (0.25 Amperes) is lower than the fusing current (1.0 Amperes), the fuses F1, F2 will carry the operating current without opening. To blow the fuses F1, F2, a current greater than or equal to 1.0 Amperes must be delivered to the downhole system. Moreover, the fuses F1, F2 may be designed to endure operation under downhole conditions that may include harsh conditions such as high temperature and thermal stresses, high mechanical shocks, vibrations, and mechanical stress.

Figure 3:
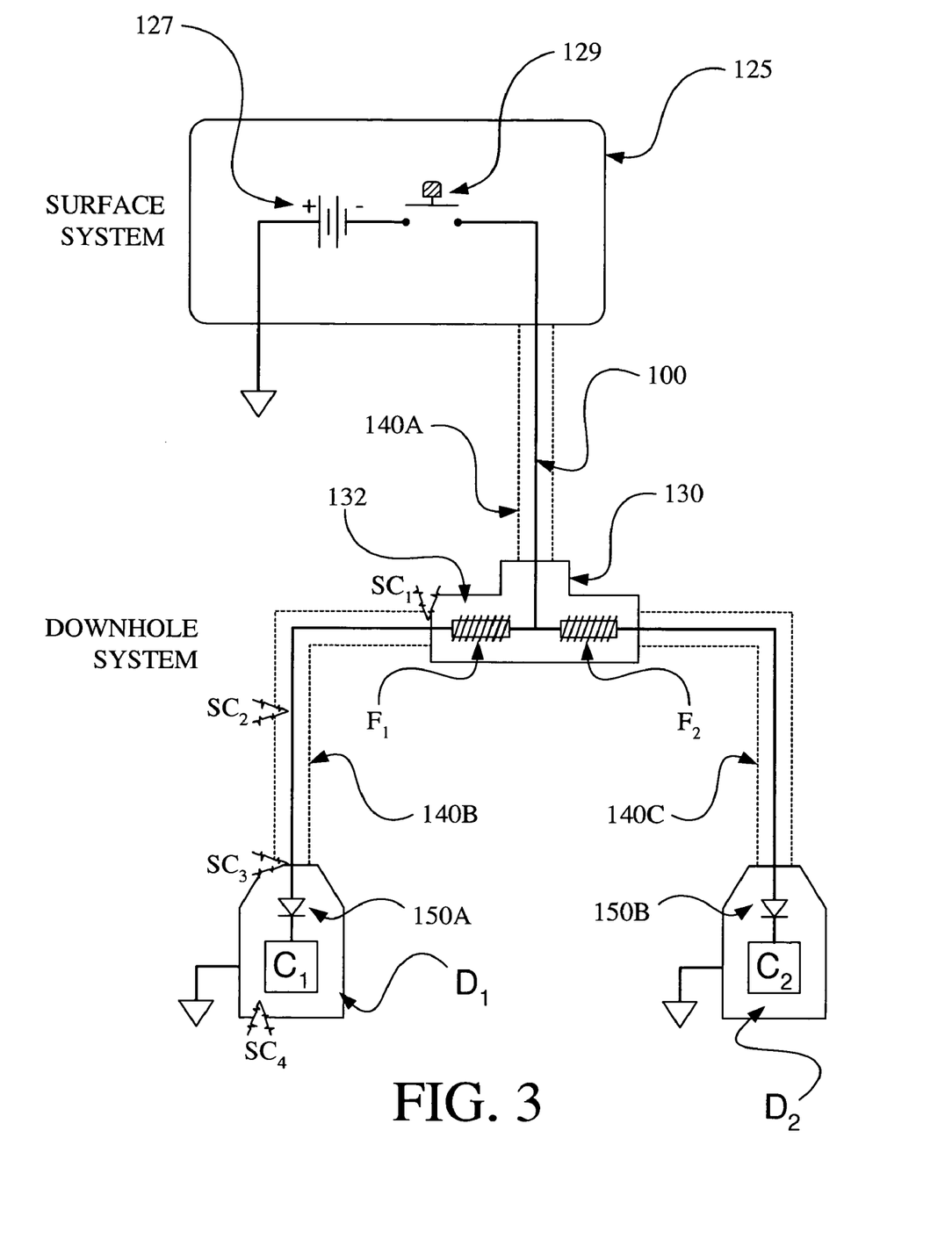
FIG. 3 is a schematic view of an embodiment of the connection system of the present invention illustrating a set of downhole devices connected to a surface power source wherein one or more short circuit conditions in one of the devices is disabling the entire set.

With reference to FIG. 3, the surface system further includes a fuse-blowing circuit 125 connectable to the downhole system and a switching device 129. The fuse-blowing circuit 125 includes a reverse-polarity electrical source 127 for supplying a second current to the downhole system. The second current has a polarity different than that of the first current and has a magnitude sufficient to open or "blow" one or more fuses F1, F2. The switching device 129 is moveable between a first position and a second position. In the first position, the current source 122 (as shown in FIG. 1) is in electrical connection with the downhole system. In the second position, the reverse-polarity current source 127 is in electrical connection with the downhole system. The switching device may be moved between the first position and the second position by any conventional manual or automated means including, but not limited to, a flip switch, a push button, a turn-knob, and so forth. The surface system may also be used for receiving measurements and/or data transmitted by the set downhole electrical devices for monitoring, controlling the wellbore environment, or for performing other functions.

In another embodiment of the present invention, the downhole connector 130 shown in FIGS. 2–5 includes shielding 140A for protecting the line 100 and shielding 140B, 140C for protecting the electrical devices D1, D2 or alternatively for protecting current paths between the downhole connector 130 and the electrical devices D1, D2. Examples of electrical shielding include metal or non-metal tubes, polymer coatings, nonconductive material wraps, and so forth. The shielding 140A, 140B, 140C is connected to the downhole connector 30 and to each device D1, D2 such as by welding, threaded connecting, and/or swaged coupling.

Figure 6A:
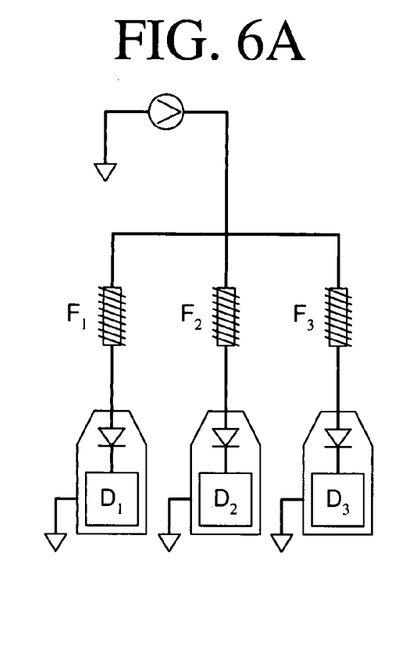
FIG. 6A is a schematic view of an embodiment of the connection system of the present invention illustrating a set of downhole electrical devices arranged in a "W" or "3-way" connection formation.
Figure 6B:
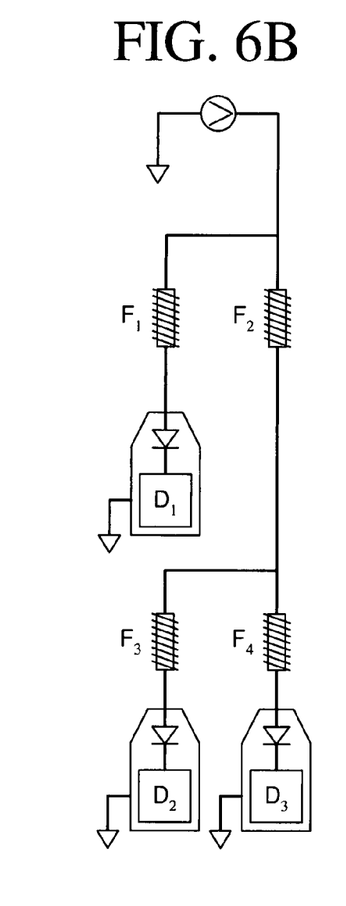
FIG. 6B is a schematic view of an embodiment of the connection system of the present invention illustrating the set of downhole electrical devices arranged in a "Y-drop down" connection formation.
Figure 6C:
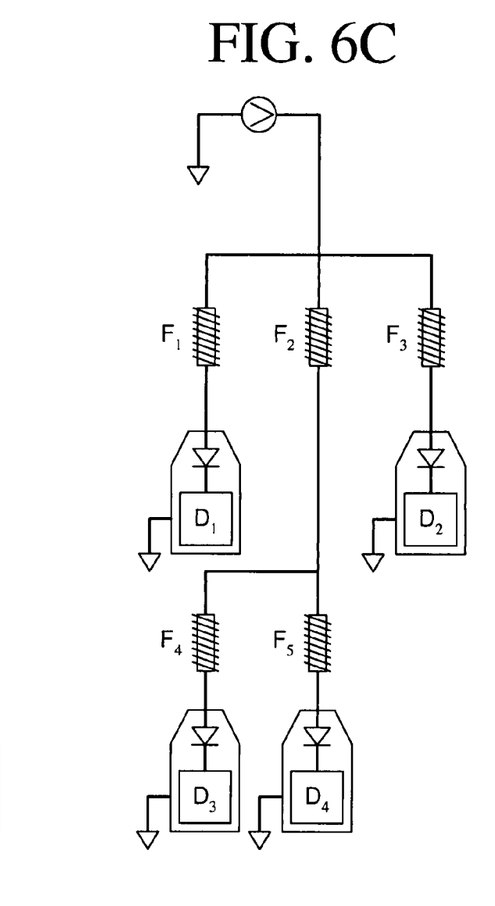
FIG. 6C is a schematic view of an embodiment of the connection system of the present invention illustrating the set of downhole electrical devices arranged in a "combination" formation.

While this figure shows a downhole system comprising only two electrical devices, those skilled in the art will appreciate that any number of downhole devices can be employed with the downhole connector system of the present invention. Examples of other electrical device and fuse arrangements are shown in FIGS. 6A–6C.

With reference to FIGS. 2–5, in operation, a set of electrical devices D1, D2 of a downhole system are installed in a wellbore with switching device 129 in the first position such that current source 122 is in connection with the downhole system (as shown in FIG. 2). The set of electrical devices D1, D2 receive a first current sufficient for powering normal operations from the current source 122 via line 100. During normal operations, the circuits C1, C2 of the set of devices D1, D2 receive sufficient power from the current source 122 to perform downhole functions. The reverse-polarity protection diodes 150A, 150B provide a path for the first current to power the devices D1, D2 respectively, but will open or interrupt the current path if a current having a polarity different than that of the first current is delivered. Thus, the circuits C1, C2 of devices D1, D2 are protected against accidental reverse-polarity connections or reverse-polarity current surges.

As shown in FIG. 3, if device D1 experiences a short circuit event due to infiltrating conductive fluid via weak points SC1, SC2, SC3, SC4 in the shielding 140B, in the device D1 itself, and/or at a connection, then the entire downhole system will fail and device D2 as well as device D1 will lose functionality.

As shown in FIG. 4, to restore functionality to the undamaged device D2, the switching device 129 is moved from the first position to the second position to connect reverse-polarity current source 127 to the downhole system. The reverse-polarity current source 127 delivers a second current having a polarity different than the polarity of the first current and having a magnitude sufficient to open fuse F1.

Still referring to FIG. 4, the protection diode 150B prevents the flow of reverse polarity current to device D2, thus fuse F2 does not receive the second reverse-polarity current. However, because the short circuit to ground event SC1, SC2, SC3, or SC4 occurs at a location between fuse F1 and the protection diode 150A, the protection diode 150A is effectively bypassed and the fuse F1 receives the second current that causes the fuse F1 to blow.

Figure 5:
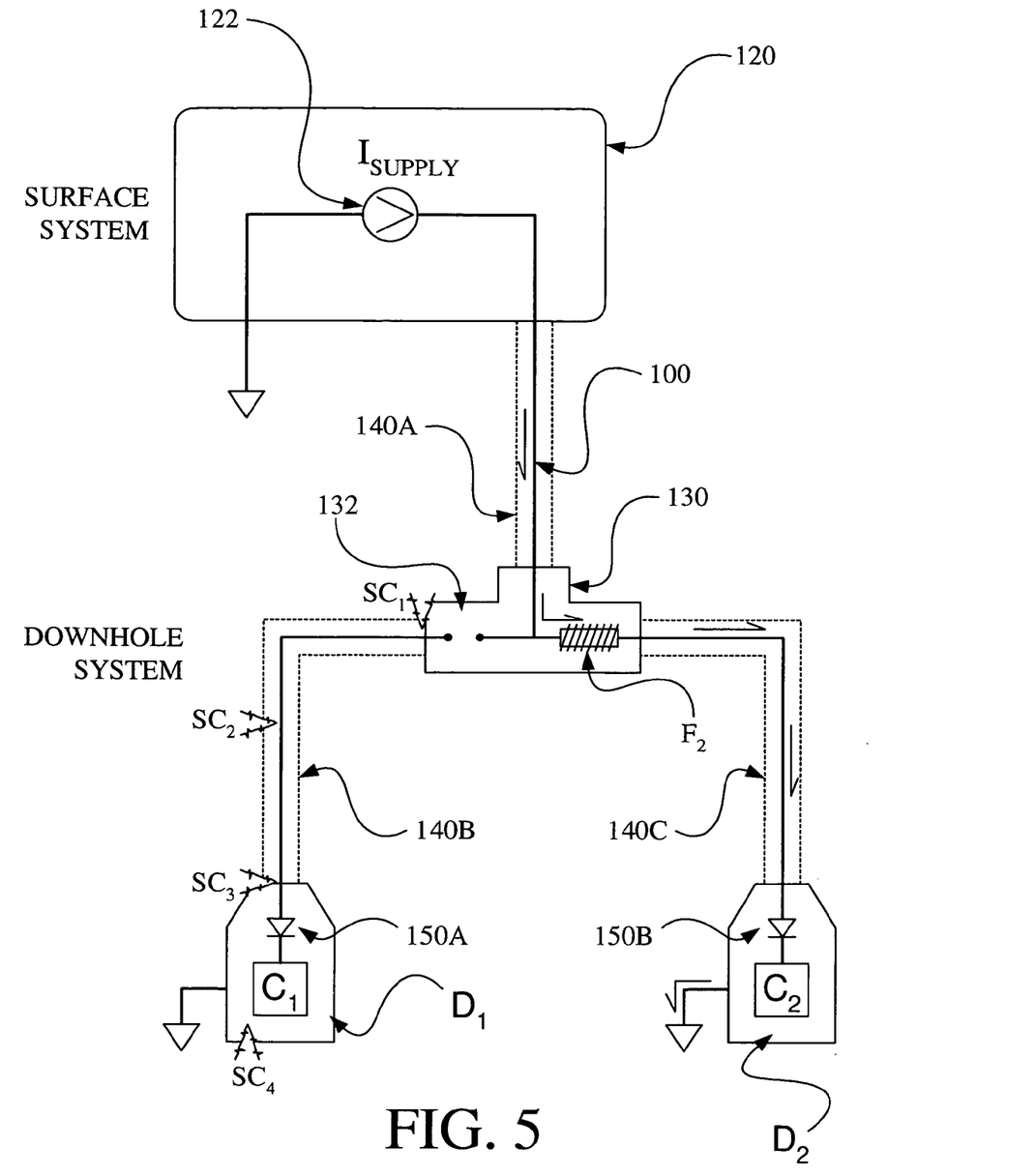
FIG. 5 is a schematic view of an embodiment of the connection system of the present invention illustrating a set of downhole devices connected to a surface power source wherein the fuse of the downhole device experiencing a short circuit condition has been opened such that functionality is restored to the remaining devices of the set.

As shown in FIG. 5, once the fuse F1 is blown, the electrical device D1 is removed from current path of the downhole system and the short circuit event SC1, SC2, SC3, or SC4 is effectively removed or isolated from the remaining downhole system. Now, the switching device 129 can be moved back into the first position to connect the power current source 122 to the downhole system, thus restoring normal functionality to the undamaged device D2.

As shown in FIGS. 6A–6C, many other embodiments of the connection system of the present invention may be achieved by varying the number and configuration of downhole electrical devices and fuses.

FIG. 6A illustrates a "W" or "3-way" connection arrangement. In this embodiment, three electrical devices D1, D2, D3 are isolatable from the downhole system by three fuses F1, F2, F3. If, for example, a short circuit condition affects device D3, then the fuse-blowing circuit is actuated to blow fuse F3 such that functionality is restored to the remaining devices D1, D2.

FIG. 6B illustrates a "Y-drop down" connection arrangement. In this embodiment, three electrical devices D1, D2, D3 are isolatable from the downhole system by three fuses F1, F3, F4. Moreover, the lower two electrical devices D2 and D3 can be simultaneously isolated from the downhole system by fuse F4 in the event that a short circuit condition develops between fuse F2 and the fuses F3, F4. Thus, for example, if a short circuit condition occurs at a point between fuse F2 and fuses F3, F4, then the fuse-blowing circuit is actuated to blow fuse F2 such that functionality is restored to the remaining device D1. In this embodiment, fuse F2 is set to blow at a higher magnitude current than fuses F3, F4 such that each fuse F3, F4 can be blown without blowing F2 and removing both devices D2, D3 from the downhole system. For example, fuse F2 may have a fusing current of 1.5 Amperes, and fuses F3, F4 may have a fusing current of 1.0 Amperes. Thus, if a short circuit condition developed in device D2, then a reverse-polarity current of 1.25 Amperes could be supplied to blow fuse F3 without blowing fuse F2. Accordingly, in this embodiment, the fuse-blowing circuit should be capable of delivering a current of variable magnitude.

FIG. 6C illustrates a "combination" connection arrangement combining the device and fuse formations of the "W" connection (FIG. 6A) and the "Y-drop down" connection (FIG. 6B). In this embodiment, four electrical devices D1, D2, D3, D4 are isolatable from the downhole system by four fuses F1, F3, F4, F5. Moreover, the lower two electrical devices D3, D4 can be simultaneously isolated from the downhole system by fuse F2 in the event that a short circuit condition develops between fuse F2 and the fuses F4 and F5. As with the "Y-drop down" connection illustrated in FIG. 6B, fuse F2 is be set to blow at a higher magnitude current than fuses F4 and F5 and the fuse-blowing circuit must be capable of delivering a current of variable magnitude. For example, fuse F2 may have a fusing current of 2.0 Amperes, and fuses F4, F5 may have a fusing current of 1.5 Amperes. Thus, if a short circuit condition developed in device D4, then a reverse-polarity current of 1.75 Amperes could be supplied to blow fuse F5 without blowing fuse F2.

Figure 7:
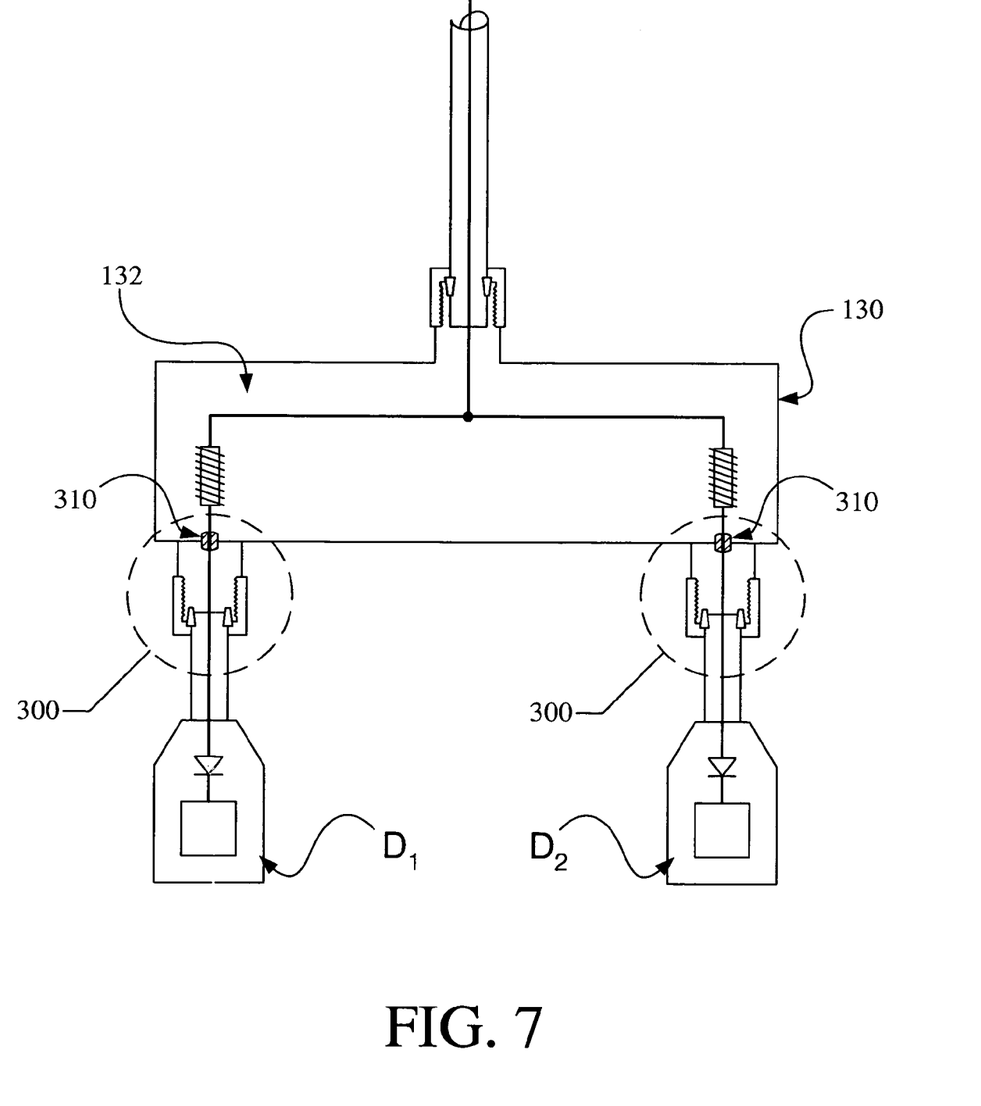
FIG. 7 is a cross-sectional view of an embodiment of the connection system of the present invention depicting a set of downhole electrical devices wherein each device is isolated by a pressure feed-through seal or bulkhead.

With reference to FIG. 7, yet another embodiment of the connection system of the present invention includes a set of seals 310 for isolating each electrical device D1, D2 from the downhole connector 130. The seals 310 function as a pressure bulkhead to prevent migration of fluid between the interior of the housing 132 of the downhole connector 130 and each device D1, D2 via the connections 300. For example, if a breach occurs in the device D1 or in the shielding between device D1 and the downhole connector 130, then the seal 130 blocks any infiltrating conductive fluid (e.g., saltwater or wellbore fluid) from entering the housing 132 and isolates the fluid to the damaged device in the same way that a bulkhead protects and isolates different chambers of a ship. The fuse-blowing circuitry and the sealing bulkheads of the present invention facilitate complete electrical and mechanical isolation of each downhole device to protect the downhole system from short circuit events.

Still with reference to FIG. 7, in another embodiment of the present invention, the seals 310 are electrical feedthroughs as described in U.S. Pat. No. 6,506,083 to Schlumberger Technology Corporation which is incorporated herein by reference.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An isolation system for use in a well, the isolation system comprising:
   a plurality of electrical devices in the well;
   a current source adapted to supply a reverse-polarity current to the electrical devices;
   a fuse set to blow upon receiving the reverse-polarity current, wherein at least one fuse is arranged between the current source and one of the electrical devices; and
   a switch movable from a first position enabling powering of the plurality of electrical devices to a second position in which the current source is connected to supply the reverse-polarity current for blowing the fuse and disconnecting an electrical device; wherein upon disconnecting the electrical device, the switch can be returned to the first position to provide power to the remaining electrical devices of the plurality of electrical devices.

2. The isolation system of claim 1, wherein each electrical device comprises a reverse-polarity protection diode.

3. The isolation system of claim 1, wherein a fuse is located between each electrical device and the current source.

4. The isolation system of claim 3, further comprising a set of seals adapted to hydraulically isolate each electrical device from the other electrical devices, wherein a seal is arranged between each electrical device and the fuse.

5. The isolation system of claim 1, further comprising: an electrical line adapted to connect the current source to the electrical devices.

6. A system for use in a well, the system comprising:
   a fuse in communication with and between an electrical line and a downhole electrical device;
   a reverse-polarity current source; and
   a reverse-polarity protection diode in communication with and between the electrical device and the fuse, wherein each fuse is fabricated from a material capable of enduring downhole thermal and mechanical stress.

7. The system of claim 6, wherein the reverse-polarity current source is adapted to deliver a current of sufficient magnitude to blow each fuse.

8. The system of claim 7, further comprising an operating current source connectable to the electrical line, wherein the operating current source is adapted to deliver a current of sufficient magnitude to operate the electrical devices.

9. The system of claim 8, wherein each diode is adapted to provide a current path from the electrical line to the electrical device in response to the operating current, and to interrupt the current path from the electrical line to the electrical device in response to the reverse-polarity current.

10. The system of claim 9, further comprising a switching device moveable between: (i) a first position wherein the electrical devices are in connection with the power source, and (ii) a second position wherein the electrical devices are in connection with the reverse-polarity current source.

11. The system of claim 6, wherein the electrical devices comprise gauges adapted to measure data in the well and communicate the data to a surface monitoring system.

12. The system of claim 11, wherein the gauges are adapted to measure and communicate temperature and pressure data in the well.

13. The system of claim 11, wherein the gauges are adapted to measure and communicate fluid flow and density data in the well.

14. The system of claim 11, wherein the gauges are adapted to measure and communicate wellbore fluid pH data.

15. The system of claim 6, wherein the electrical devices comprise valve controls adapted to manipulate fluid flow into or out of the well.

16. The system of claim 6, further comprising a seal between the fuse and each electrical device, the seal adapted to hydraulically isolate each electrical device to prevent an infiltrating conductive fluid from migrating throughout the electrical devices.

17. A downhole connector, comprising:
    a housing, comprising: (i) a first electrical connection, (ii) a second electrical connection, and (iii) a third electrical connection;
    a plurality of fuses, comprising: (i) a first fuse arranged between the first electrical connection and the second electrical connection, and (ii) a second fuse arranged between the first electrical connection and the third electrical connection; and
    a plurality of seals, comprising: (i) a first seal located near the second electrical connection, and (ii) a second seal located near the third electrical connection.

18. The downhole connector of claim 17, wherein the first connector is adapted to connect the housing to a surface system via an electrical line.

19. The downhole connector of claim 17, wherein the second connector and third connector are adapted to connect the housing to a plurality of downhole electrical devices.

20. The downhole connector of claim 19, wherein the first fuse and second fuse are adapted to electrically isolate each downhole electrical device from the other downhole electrical devices.

21. The downhole connector of claim 19, wherein the first seal and second seal are adapted to hydraulically isolate each downhole electrical device from the other downhole electrical devices.

22. A method, comprising:
    electrically isolating a short circuited electrical device from another electrical device by blowing a fuse, wherein the electrical devices are located downhole; and
    applying a reverse-polarity current to blow the fuse.

23. The method of claim 22, further comprising: hydraulically isolating the short circuited electrical device from another electrical device by sealing the short circuited electrical device.

24. The method of claim 22, further comprising: preventing the reverse-polarity current from damaging the other electrical device when blowing the fuse.

25. A method, comprising:
    providing a plurality of electrical devices connected to an electrical line in a well, the electrical line comprising a tubular encasement;
    preventing hydraulic flow through at least a portion of the electrical line; and
    selectively isolating the electrical devices using fuses.

* * * * *